United States Patent
Yamato et al.

(10) Patent No.: US 10,882,349 B2
(45) Date of Patent: Jan. 5, 2021

(54) THERMAL TRANSFER RECORDING MEDIUM

(71) Applicant: TOPPAN PRINTING CO., LTD., Tokyo (JP)

(72) Inventors: Takehito Yamato, Tokyo (JP); Takeshi Arita, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 4 days.

(21) Appl. No.: 16/510,595

(22) Filed: Jul. 12, 2019

(65) Prior Publication Data
US 2019/0329580 A1  Oct. 31, 2019

Related U.S. Application Data

(63) Continuation of application No. PCT/JP2018/007571, filed on Feb. 28, 2018.

(30) Foreign Application Priority Data

Mar. 1, 2017  (JP) .................... 2017-038272

(51) Int. Cl.
  *B32B 27/30*  (2006.01)
  *B41M 5/395*  (2006.01)
  (Continued)

(52) U.S. Cl.
  CPC ........... *B41M 5/395* (2013.01); *B32B 27/306* (2013.01); *B32B 27/38* (2013.01); *B41M 5/385* (2013.01);
  (Continued)

(58) Field of Classification Search
  CPC .................. B32B 27/306; B32B 27/38; Y10T 428/24802; Y10T 428/24942
  (Continued)

(56) References Cited

U.S. PATENT DOCUMENTS

| 5,232,894 A | 8/1993 | Chosa |
| 5,716,477 A | 2/1998 | Yamaguchi et al. |

(Continued)

FOREIGN PATENT DOCUMENTS

| EP | 0 495 496 A1 | 7/1992 |
| JP | S6094386 A | 5/1985 |
| JP | H04-175190 A | 6/1992 |
| JP | H05-124365 A | 5/1993 |
| JP | 2006-218738 A | 8/2006 |

(Continued)

OTHER PUBLICATIONS

Extended European Search Report dated Feb. 18, 2020 for corresponding Application No. 18761025.8.

(Continued)

*Primary Examiner* — Betelhem Shewareged
(74) *Attorney, Agent, or Firm* — Foley & Lardner LLP

(57) ABSTRACT

A thermal transfer recording medium which includes a dye layer having storage stability and sufficient color development properties, and enables improvement in image quality of the printed matter. The thermal transfer recording medium according to an embodiment of the present invention includes a substrate, a heat-resistant lubricating layer provided on a first surface of the substrate, and a dye layer provided on a second surface of the substrate, wherein the dye layer includes a dye, a binder A, and a binder B which contains at least one of polyvinyl butyral and polyvinyl acetal, a solubility parameter of the binder A is within a range of 9.5 $(cal/cm^3)^{1/2}$ or more and 12.0 $(cal/cm^3)^{1/2}$ or less, and a melting viscosity of the binder A at 200° C. is 400 Pa sec or less.

4 Claims, 1 Drawing Sheet

(51) Int. Cl.
*B41M 5/382* (2006.01)
*B41M 5/385* (2006.01)
*B32B 27/38* (2006.01)

(52) U.S. Cl.
CPC .. *B41M 5/38214* (2013.01); *Y10T 428/24802* (2015.01); *Y10T 428/24942* (2015.01)

(58) Field of Classification Search
USPC ...................................... 428/195.1
See application file for complete search history.

(56) References Cited

U.S. PATENT DOCUMENTS

| | | | |
|---|---|---|---|
| 2014/0232808 A1* | 8/2014 | Ono | B41M 5/44 347/221 |
| 2016/0280885 A1* | 9/2016 | Yoshizawa | C08K 5/11 |
| 2019/0329580 A1* | 10/2019 | Yamato | B41M 5/42 |

FOREIGN PATENT DOCUMENTS

| | | |
|---|---|---|
| JP | 2009-083117 A | 4/2009 |
| JP | 2009-241354 A | 10/2009 |
| JP | 2012-101362 A | 5/2012 |
| JP | 2013-202846 A | 10/2013 |
| JP | 2014-054775 A | 3/2014 |
| JP | 2014-188949 A | 10/2014 |
| JP | 5929217 B2 | 6/2016 |
| WO | WO-2016/121311 A1 | 8/2016 |

OTHER PUBLICATIONS

International Searching Authority, "International Search Report," issued in connection with International Patent Application No. PCT/JP2018/007571, dated Apr. 5, 2018.

International Searching Authority, "Written Opinion," issued in connection with International Patent Application No. PCT/JP2018/007571, dated Apr. 5, 2018.

* cited by examiner

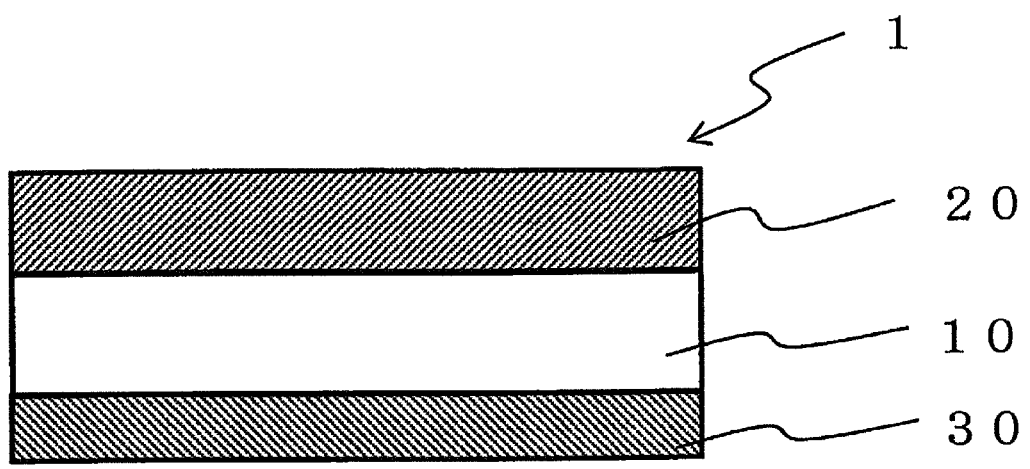

THERMAL TRANSFER RECORDING MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/007571, filed on Feb. 28, 2018, which is based upon and claims the benefit of priority to and to Japanese Patent Application No. 2017-038272, filed on Mar. 1, 2017; the disclosures of which are all incorporated herein by reference in their entireties.

TECHNICAL FIELD

The present invention relates to a thermal transfer recording medium.

BACKGROUND ART

A thermal transfer recording medium, often called a thermal ribbon, is an ink ribbon for use with a thermal transfer printer, and is provided with a thermal transfer layer on one surface of the substrate and a heat-resistant lubricating layer or a back coat layer on the other surface of the substrate. The thermal transfer layer is an ink layer, and ink is sublimated and transferred to a transfer target by a sublimation transfer method or melted and transferred by a melt transfer method, using heat generated at a thermal head of the printer.

Of these methods, the sublimation transfer method enables easy full-color production of various images in combination with a sophisticated printer, and thus has been widely used for self-prints from digital cameras, cards such as for identification, and output materials for amusement.

As these applications have been diversified and widely used, high image quality, high color development properties, and high speed printing are demanded in printing by sublimation transfer methods. Accordingly, the thermal transfer recording medium is also required to have characteristics to respond to these demands.

In the thermal transfer recording medium, in order to satisfy the demands for high image quality and color development in printing, a dye contained in the dye layer may be held in a dissolved state in a binder. In this case, since the dye in the dye layer is more energetically stable in a crystalline state than in a dissolved state, there is a risk that the dye in the dissolved state may be separated out, that is, crystallized with the elapse of time or depending on storage conditions.

In order to prevent dye separation, for example, a compounding ratio between the dye and the binder, that is, a dye/binder ratio can be decreased. Alternatively, a material having high affinity for the dye can be used for the binder. The former is not desired due to increased energy usage, and the latter is not desired since a large amount of dye is left in the dye layer depending on the compounding ratio of the image-receiving layer resin.

In order to avoid these cases, for example, PTL 1 discloses a thermal transfer recording medium that enables storage stability and color development by using a phenoxy resin as the binder resin, setting the dye/binder ratio within a range of 2.5 to 3.5, and setting the coating amount of the dye layer within a range of 0.25 to 0.35 g/m². The storage stability as described herein refers to a characteristic of minimizing the amount of dye separated out.

CITATION LIST

Patent Literature

PTL 1: JP 5929217 B2

SUMMARY OF THE INVENTION

Technical Problem

When the storage stability and color development were evaluated using the thermal transfer recording medium described in PTL 1, the storage stability and color development were excellent. However, in the thermal transfer recording medium described in PTL 1, unevenness in image quality due to unevenness in heat transfer was observed. Further, the unevenness in image quality was particularly obvious in low gradation regions.

In view of the above problems, an object of the present invention is to provide a thermal transfer recording medium which includes a dye layer having storage stability and sufficient color development properties, and enables improvement in image quality of the printed matter.

Solution to Problem

In order to solve the above problem, a thermal transfer recording medium according to an aspect of the present invention includes a substrate, a heat-resistant lubricating layer provided on a first surface of the substrate, and a dye layer provided on a second surface of the substrate, wherein the dye layer includes a dye, a first binder, and a second binder which contains at least one of polyvinyl butyral and polyvinyl acetal, a solubility parameter of the first binder is within a range of 9.5 $(cal/cm^3)^{1/2}$ or more and 12.0 $(cal/cm^3)^{1/2}$ or less, and a melting viscosity of the first binder at 200° C. is 400 Pa sec or less.

DESIRED ADVANTAGEOUS EFFECTS OF THE INVENTION

The thermal transfer recording medium according to an aspect of the present invention has storage stability and sufficient color development properties, and enables improvement in image quality of the printed matter.

BRIEF DESCRIPTION OF THE DRAWINGS

The FIGURE is a schematic cross-sectional view illustrating a structure of a thermal transfer recording medium according to an embodiment of the present invention.

DETAILED DESCRIPTION OF REPRESENTATIVE EMBODIMENTS

With reference to the accompanying FIGURE, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

<Thermal Transfer Recording Medium>

As shown in the FIGURE, a thermal transfer recording medium 1 of the present embodiment is configured such that a heat-resistant lubricating layer 30 that imparts lubricity to a thermal head is provided on a first surface of the substrate 10, and a dye layer 20 is provided on a second surface of the substrate 10.

<Substrate>

The substrate 10 is required to have thermal resistance and strength so as not to deform under heat and pressure during thermal transfer.

Example materials for the substrate 10 include films of synthetic resins, such as polyethylene terephthalate, polyethylene naphthalate, polypropylene, cellophane, acetate, polycarbonate, polysulfone, polyimide, polyvinyl alcohol, aromatic polyamide, aramid, and polystyrene; paper, such as condenser paper and paraffin paper; and composites thereof. Among these, in view of physical properties, processability, cost and the like, polyethylene terephthalate film is preferred.

Further, considering usability and processability, the substrate 10 may have a thickness, that is, the length in the vertical direction in the FIGURE, of 2 μm or more and 50 μm or less. Specifically, in view of handling properties such as transfer suitability and processability, a substrate 10 with a thickness of 2 μm or more and 9 μm or less is preferred.

Further, adhesion processing can be applied to the surface of the substrate 10 on which the heat-resistant lubricating layer 30 is formed, that is, the surface on the lower side in the FIGURE, and to the surface on which the dye layer 20 is formed, that is, the surface on the upper side in the FIGURE. The adhesion processing can be applied to either or both of these surfaces.

The adhesion processing includes known techniques such as corona treatment, flame treatment, ozone treatment, ultraviolet treatment, radiation treatment, surface roughening treatment, plasma treatment, and primer treatment. These treatments can also be used in combination of two or more.

In this embodiment, improvement in adhesiveness between the substrate 10 and the dye layer 20 is advantageous. Accordingly, a suitable example in view of the cost is polyethylene terephthalate film to which primer treatment is applied.

<Heat-Resistant Lubricating Layer>

The heat-resistant lubricating layer 30 is a layer formed on the first surface of the substrate 10 and provides the thermal transfer recording medium 1 with lubricity to a thermal head.

The heat-resistant lubricating layer 30 is formed, for example, by preparing a coating solution for forming the heat-resistant lubricating layer 30, that is, a heat-resistant lubricating layer-forming coating solution, by blending a binder resin with a functional additive for imparting releasability or lubricity, a filler, a curing agent, a solvent and the like as necessary, and by applying and drying the prepared coating solution.

[Binder]

Examples of the binder used for the heat-resistant lubricating layer 30 include a polyvinyl butyral resin, polyvinyl acetoacetal resin, polyester resin, vinyl chloride-vinyl acetate copolymer, polyether resin, polybutadiene resin, polystyrene resin, acrylic polyol, polyurethane acrylate, polyester acrylate, polyether acrylate, epoxy acrylate, nitrocellulose resin, cellulose acetate resin, polyamide resin, polyimide resin, polyamide-imide resin or polycarbonate resin.

[Functional Additive]

Examples of the functional additive include surfactants, including natural wax such as animal wax and plant wax; synthetic wax such as synthetic hydrocarbon wax, aliphatic alcohol and acid wax, fatty acid ester and glycerite wax, synthetic ketone wax, amine and amide wax, chlorinated hydrocarbon wax, and alpha olefin wax; higher fatty acid esters such as butyl stearate and ethyl oleate; higher fatty acid metal salts such as sodium stearate, zinc stearate, calcium stearate, potassium stearate, and magnesium stearate; and phosphate esters such as long-chain alkyl phosphate ester, polyoxyalkylene alkyl aryl ether phosphate ester, and polyoxyalkylene alkyl ether phosphate ester.

[Filler]

Examples of the filler include talc, silica, mica, magnesium oxide, zinc oxide, calcium carbonate, magnesium carbonate, magnesium hydroxide, kaolinite, clay, silicone particles, polyethylene resin particles, polypropylene resin particles, polystyrene resin particles, and polymethyl methacrylate resin particles.

[Curing Agent]

Examples of the curing agent include isocyanates such as tolylene diisocyanate, triphenylmethane triisocyanate, and tetramethylxylene diisocyanate, and derivatives thereof.

[Dry Coating Amount of Heat-Resistant Lubricating Layer]

In the present embodiment, the dry coating amount of the heat-resistant lubricating layer 30 is suitably within a range of 0.1 $g/m^2$ or more and 2.0 $g/m^2$ or less.

The dry coating amount of the heat-resistant lubricating layer 30 described herein refers to a solid content left after coating and drying of the coating solution for forming the heat-resistant lubricating layer 30, that is, the heat-resistant lubricating layer-forming coating solution.

[Dye Layer]

The dye layer 20 is a layer provided on the second surface of the substrate 10. The dye layer 20 is formed, for example, by preparing a coating solution for forming the dye layer 20, that is, a dye layer-forming coating solution, by blending a thermal transfer dye, binder, solvent, release agent, and the like as necessary, and by applying and drying the prepared coating solution.

[Thermal Transfer Dye]

The thermal transfer dye is a dye that is molten, diffused, or sublimation-transferred by heat.

Yellow components used for the thermal transfer dye may include, for example, C.I. Solvent Yellow 56, 16, 30, 93, and 33, and C.I. Disperse Yellow 201, 231, and 33.

Further, magenta components used for the thermal transfer dye may include, for example, C.I. Disperse Violet 26 and 31, C.I. Disperse Red 60, and C.I. Solvent Red 19 and 27.

Further, cyan components used for the thermal transfer dye may include, for example, C.I. Disperse Blue 24, 257, and 354, and C.I. Solvent Blue 36, 63, and 266.

In addition, the dyes described above can be combined and toned as a black dye.

[Binder]

The dye layer 20 includes at least two binders, which are composed of a first binder, binder A, and a second binder, binder B. The binder B is, for example, at least one of polyvinyl butyral and polyvinyl acetal. Polyvinyl butyral and polyvinyl acetal, when used as a binder for the dye layer 20, are relatively balanced between dye stability, that is, storage stability and color development properties, and thus commonly used for thermal transfer recording media. However, since the color development properties are relatively dominant, the dye stability tends to be poor in relative terms.

The binder A may have a solubility parameter in the range of 9.5 $(cal/cm^3)^{1/2}$ or more and 12.0 $(cal/cm^3)^{1/2}$ or less, and a melting viscosity at 200° C. in the range of 400 Pa·sec or less. When the solubility parameter is in the range of 9.5 $(cal/cm^3)^{1/2}$ or more and 12.0 $(cal/cm^3)^{1/2}$ or less, the dye stability is improved. Further, when the solubility parameter is less than 9.5 $(cal/cm^3)^{1/2}$, the dye solubility in the binder A tends to be lowered, and thus the dye stability tends to be lowered. In addition, when the solubility parameter is more than 12.0 $(cal/cm^3)^{1/2}$, the dye solubility in the binder A tends to be too high, and thus the dye transferability tends to be lowered. In general, the higher the dye stability, the lower the color development properties. When the melting viscosity of the binder A at 200° C. is 400 Pa·sec or less, dye transfer at the time of application is relatively easy and high color development properties can be maintained. Further, when the melting viscosity of the binder A at 200° C. is more than 400 Pa sec, the melting viscosity is too high, and dye transfer at the time of application tends to be lowered.

The above solubility parameter is calculated by the Fedors equation: $\delta i=[Ev/V]^{(1/2)}=[\Sigma\Delta ei/\Sigma\Delta vi]^{(1/2)}$, where Ev represents evaporation energy, V represents molar volume, $\Sigma\Delta ei$ represents cohesive energy, and $\Sigma\Delta vi$ represents molar volume of atoms or atomic groups.

As described above, materials for the binder A may have a solubility parameter in the range of 9.5 $(cal/cm^3)^{1/2}$ or more and 12.0 $(cal/cm^3)^{1/2}$ or less, and a melting viscosity at 200° C. in the range of 400 Pa·sec or less. Here, examples of the materials having the solubility parameter within the above range, that is, materials for the binder A, specifically include cellulose resins such as ethyl cellulose, hydroxyethyl cellulose, ethylhydroxy cellulose, hydroxypropyl cellulose, methylcellulose, cellulose acetate, and cellulose nitrate, phenoxy resins, and polyvinyl acetate. Further, when the solubility parameter deviates from the above range, the dye stability tends to be reduced.

The compounding ratio between the binder A and the binder B, for example, the mass ratio between the binder A and the binder B (mass of the first binder/mass of the second binder) is preferably in the range of 5/95 to 30/70. When the compounding ratio of the binder A is less than 5%, the dye stability in the dye layer 20 tends to be lowered. Further, when the compounding ratio exceeds 30%, the color development properties tend to be slightly reduced. Accordingly, the dye stability and color development properties are suitably balanced within the above numerical range.

[Release Agent]

The dye layer 20 may contain a release agent. The release agent is a component that prevents fusion between the dye layer 20 and a transfer target due to heat at the time of printing. Examples of the release agent include various oils and surfactants based on silicone, fluorine, phosphate esters, fatty acid esters, fatty acid amides, and the like.

In the field of thermal transfer recording media, in order to increase the speed of printing, the energy output during transfer has been increased. Further, in order to prevent printing defects caused by fusion between the transfer target and the thermal transfer recording medium due to an increase in the energy output during transfer, methods for adding a release agent to the dye layer that constitutes the thermal transfer recording medium have been proposed.

However, since the release agent generally has a small molecular weight, it migrates to the surface of the dye layer due to the elapse of time or during storage under environmental conditions. Although this phenomenon is preferable in enhancing releasability of the surface of the thermal transfer recording medium, it may cause the dye to migrate to the surface of the dye layer. Due to this dye migration, the dye may be transferred to the heat-resistant lubricating layer that constitutes the thermal transfer recording medium, when the thermal transfer recording medium is stored in a roll. Further, when the thermal transfer recording medium in which the dye has been transferred to the heat-resistant lubricating layer is rewound, the dye may be further transferred from the heat-resistant lubricating layer to the dye layer of another color or to a protective layer. Accordingly, the dye migration may cause image quality problems such as set-off by which the printed matter exhibits unintended color, and scumming by which the dye is transferred to the transfer target at a portion where heat is not applied from the thermal head at the time of printing.

In order to avoid such problems, for example, Japanese Patent No. 4559994 describes that the dye is dissolved in a thermal transfer additive at a temperature higher than the melting point of the thermal transfer additive. The publication further describes that the thermal transfer additive is at least one selected from the group consisting of hydroxystearic acid triglyceride, 12-hydroxystearic acid cholesteryl, and 12-hydroxystearic acid ethyl. In addition, the publication describes that the thermal transfer additive is contained in the proportion of 10 to 30 parts by mass per 100 parts by mass of the binder resin.

However, according to the method described in the above publication, since the affinity is high between the thermal transfer additive and the dye, a difference in dye density may be generated between the binder resin and the additive during storage under the environment, which often causes a problem of image defects.

Therefore, according to the thermal transfer recording medium of the present embodiment, the solubility parameter of the release agent can be 9.0 $(cal/cm^3)^{1/2}$ or less to thereby reduce the affinity between the release agent and the dye, and prevent the dye from being localized as the release agent is localized on the surface. As a result, the storage stability of the thermal transfer recording medium can be improved.

As described above, when the solubility parameter of the release agent is within the above numerical range, sufficient releasability between the transfer target and the dye layer can be achieved. Therefore, it is possible to provide a thermal transfer recording medium that enables high energy output during transfer and high speed printing.

Examples of the release agent may be above-mentioned various oils and surfactants having the solubility parameter within the above range. Among these, those based on silicone or fluorine are preferred in view of releasability, and silicone oil is specifically preferred in view of dispersibility in the coating solution.

Examples of the silicone oil used for the release agent include amino-modified silicone oil, epoxy-modified silicone oil, carbinol-modified silicone oil, methacryl-modified silicone oil, polyether-modified silicone oil, phenol-modified silicone oil, acrylic-modified silicone oil, carboxylic anhydride-modified silicone oil, diol-modified silicone oil, mercapto-modified silicone oil, carboxyl-modified silicone oil, dimethyl silicone oil, methylphenyl silicone oil, methyl hydrogen silicone oil, aralkyl-modified silicone oil, fluoroalkyl-modified silicone oil, long chain alkyl-modified silicone oil, higher fatty acid ester-modified silicone oil, and higher fatty acid amide-modified silicone oil.

Examples of the fluorine-based compound used for the release agent include fluorine-modified resin, fluoro surfactant, fluoro resin, and fluoro oligomer.

Examples of the phosphate ester used for the release agent include phosphate monoester or diester of saturated or unsaturated higher alcohols, phosphate monoester or diester of polyoxyalkylene alkyl ether or polyoxyalkylene alkyl allyl ether, and phosphate monoester or diester of alkylene oxide adducts of saturated or unsaturated higher alcohols.

Examples of the fatty acid ester used for the release agent include sorbitan fatty acid ester, polyoxyethylene fatty acid ester, polyoxyethylene sorbitan fatty acid ester, polyoxyethylene sorbitol fatty acid ester, glycerin fatty acid ester, and pentaerythritol fatty acid ester.

Examples of the fatty acid amide used for the release agent include saturated or unsaturated fatty acid amide, saturated or unsaturated fatty acid bisamide, methylolamide, aromatic bisamide, and fatty acid ester amide.

The mass-average molecular weight of the release agent is preferably in the range of 500 or more and 50,000 or less. When the mass-average molecular weight of the release agent is less than 500, the release agent tends to migrate excessively to the surface. Accordingly, even if the solubility parameter is within the above range and the affinity between the release agent and dye is low, the dye tends to be localized. Further, when the mass-average molecular weight of the release agent is more than 50,000, the release agent is not likely to migrate to the surface. Accordingly, the effect of the release agent is difficult to achieve.

[Other Additives]

Furthermore, the dye layer 20 may contain known additives such as isocyanate compounds, silane coupling agents, dispersants, viscosity modifiers, and stabilizers within a range that does not impair its performance.

[Dry Coating Amount of Dye Layer]

The dry coating amount of the dye layer 20 is suitably within a range of 0.5 g/m$^2$ or more and 1.0 g/m$^2$ or less. When the coating amount is excessively large, that is, when the coating amount is more than 1.0 g/m$^2$, heat at the time of printing is not sufficiently transferred, leading to a decrease in the utilization of the dye. On the other hand, when the coating amount is excessively small, that is, when the coating amount is less than 0.5 g/m$^2$, color development is reduced due to lack of the dye. Alternatively, in order to prevent the above problems, the content of the dye may be increased. In that case, the dye is excessively sensitive to heat at the time of printing, and susceptible to thermal conduction unevenness in the respective layers, leading to coloring unevenness. It should be noted that the dye layer 20 may be configured by a single layer of a single color or, alternatively, may be configured by successively and repeatedly forming a plurality of dye layers 20 that contain dyes of different hues on the same surface of the same substrate 10.

[Other Layers]

Further, a layer may be provided between the substrate 10 and the dye layer 20 or between the substrate 10 and the heat-resistant lubricating layer 30 for the purpose of imparting functionality such as improvement in adhesiveness or improvement in dye usage efficiency.

[Coating Methods]

The heat-resistant lubricating layer 30 and the dye layer 20 can be formed by applying and drying a coating solution by using a known coating method.

Examples of the coating method include gravure coating, screen printing, spray coating, reverse roll coating, and die coating.

EXAMPLES

Specific examples of the present invention will now described. The term "part" as described herein is on a mass basis unless otherwise specified, and all the compounding ratios are based on a mass ratio. Furthermore, the invention should not be construed as limited to the examples.

For the samples of thermal transfer recording medium prepared in Examples 1 to 8 and Comparative Examples 1 to 5, the storage stability, density, and density unevenness were evaluated. Table 1 shows the material of the binder A, the solubility parameter and the melting viscosity of the binder A, the material of the binder B, the compounding ratio between the binder A and the binder B, and various evaluation results for the respective samples.

For the samples of thermal transfer recording medium prepared in Examples 9 to 18 and Comparative Examples 6 to 10, the storage stability, density, density unevenness, and releasability were evaluated. For the sample of thermal transfer recording medium prepared in Example 15, the storage stability and releasability were evaluated. Table 2 shows the material of the binder A, the solubility parameter and the melting viscosity of the binder A, the material of the binder B, the compounding ratio between the binder A and the binder B, the material of the release agent, the solubility parameter of the release agent, and various evaluation results for the respective samples.

Examples 1 to 8 and Comparative Examples 1 to 5

<Preparation of Transfer Target>

In the following Examples 1 to 8 and Comparative Examples 1 to 5, a transfer target for thermal transfer was prepared by using a method described below.

A double sided resin-coated paper of 190 µm was used as a substrate. One of the surfaces of the paper was coated with a coating solution for forming a heat-resistant lubricating layer having the following composition by die coating with a dry coating amount of 8.0 g/m$^2$. Then, the coated solution was dried to thereby form a heat-insulating layer. Subsequently, an outer surface of the heat-insulating layer was coated with a coating solution for forming an image-receiving layer having the following composition by gravure coating with a dry coating amount of 4.0 g/m$^2$. Then, the coated solution was dried to thereby form a transfer target for thermal transfer.

[Coating Solution for Forming Heat-Resistant Lubricating Layer]
Acryl-styrene hollow particles: 35.0 parts
(Average particle size: 1 μm, volume empty rate: 51%)
Styrene-butadiene rubber: 10.0 parts
Pure water: 55.0 parts
Dispersant: small amount
Antifoaming agent: small amount
[Coating Solution for Forming Image-Receiving Layer]
Vinyl chloride-vinyl acetate-vinyl alcohol copolymer: 19.5 parts
Amino-modified silicone oil: 0.5 parts
Toluene: 40.0 parts
Methyl ethyl ketone: 40.0 parts The amino-modified silicone oil in the coating solution for forming an image-receiving layer serves as a release agent for preventing fusion between the dye layer and the transfer target at the time of printing.

Example 1

A 4.5 μm-thick polyethylene terephthalate film with an easy adhesion treatment applied on one surface was used as the substrate 10. A surface of the substrate on which the easy adhesion treatment was not applied was coated with a coating solution having the following composition (coating solution for forming a heat-resistant lubricating layer 30 of Example 1; hereinafter, "heat-resistant lubricating layer-forming coating solution-1") by gravure coating with a dry coating amount of 0.5 g/m². Then, the coated solution was dried at a temperature of 100° C. for 1 minute to thereby form a heat-resistant lubricating layer 30.

After the heat-resistant lubricating layer 30 was formed, a surface of the substrate on which the easy adhesion treatment was applied was coated with a coating solution having the following composition (coating solution for forming a dye layer 20; hereinafter, "dye layer-forming coating solution-1") by gravure coating with a dry coating amount of 0.80 g/m². Then, the coated solution was dried at a temperature of 90° C. for 1 minute to thereby form a dye layer 20. Thus, a thermal transfer recording medium 1 of Example 1 was obtained.

<Heat-Resistant Lubricating Layer-Forming Coating Solution-1>
Acetal resin: 5.0 parts
Mica: 0.5 parts
Magnesium hydroxide: 0.1 parts
Phosphate ester: 0.9 parts
Toluene: 5.5 parts
MEK: 13.0 parts
<Dye Layer-Forming Coating Solution-1>
C.I. Solvent Blue 63: 6.0 parts
Polyvinyl acetal resin: 3.1 parts
Polyvinyl acetate resin: 0.9 parts
Toluene: 45.0 parts
Methyl ethyl ketone: 45.0 parts Example 2

A thermal transfer recording medium 1 of Example 2 was obtained in the same manner as in Example 1, except that a dye layer 20 was formed by using a coating solution having the following composition (coating solution for forming a dye layer 20 of Example 2; hereinafter, "dye layer-forming coating solution-2") in the thermal transfer recording medium 1 prepared in Example 1.

<Dye Layer-Forming Coating Solution-2>
C.I. Solvent Blue 63: 6.0 parts
Polyvinyl acetal resin: 3.5 parts
Polyvinyl acetate resin: 0.5 parts
Toluene: 45.0 parts
Methyl ethyl ketone: 45.0 parts Example 3

A thermal transfer recording medium 1 of Example 3 was obtained in the same manner as in Example 1, except that a dye layer 20 was formed by using a coating solution having the following composition (coating solution for forming a dye layer 20 of Example 3; hereinafter, "dye layer-forming coating solution-3") in the thermal transfer recording medium 1 prepared in Example 1.

<Dye Layer-Forming Coating Solution-3>
C.I. Solvent Blue 63: 6.0 parts
Polyvinyl acetal resin: 3.7 parts
Polyvinyl acetate resin: 0.3 parts
Toluene: 45.0 parts
Methyl ethyl ketone: 45.0 parts Example 4

A thermal transfer recording medium 1 of Example 4 was obtained in the same manner as in Example 1, except that a dye layer 20 was formed by using a coating solution having the following composition (coating solution for forming a dye layer 20 of Example 4; hereinafter, "dye layer-forming coating solution-4") in the thermal transfer recording medium 1 prepared in Example 1.

<Dye Layer-Forming Coating Solution-4>
C.I. Solvent Blue 63: 6.0 parts
Polyvinyl acetal resin: 2.9 parts
Polyvinyl acetate resin: 1.1 parts
Toluene: 45.0 parts
Methyl ethyl ketone: 45.0 parts Example 5

A thermal transfer recording medium 1 of Example 5 was obtained in the same manner as in Example 1, except that a dye layer 20 was formed by using a coating solution having the following composition (coating solution for forming a dye layer 20 of Example 5; hereinafter, "dye layer-forming coating solution-5") in the thermal transfer recording medium 1 prepared in Example 1.

<Dye Layer-Forming Coating Solution-5>
C.I. Solvent Blue 63: 6.0 parts
Polyvinyl acetal resin: 3.9 parts
Polyvinyl acetate resin: 0.1 parts
Toluene: 45.0 parts
Methyl ethyl ketone: 45.0 parts Example 6

A thermal transfer recording medium 1 of Example 6 was obtained in the same manner as in Example 1, except that a dye layer 20 was formed by using a coating solution having the following composition (coating solution for forming a dye layer 20 of Example 6; hereinafter, "dye layer-forming coating solution-6") in the thermal transfer recording medium 1 prepared in Example 1.

<Dye Layer-Forming Coating Solution-6>
C.I. Solvent Blue 63: 6.0 parts
Polyvinyl acetal resin: 2.7 parts
Polyvinyl acetate resin: 1.3 parts
Toluene: 45.0 parts
Methyl ethyl ketone: 45.0 parts

Example 7

A thermal transfer recording medium 1 of Example 7 was obtained in the same manner as in Example 1, except that a dye layer 20 was formed by using a coating solution having the following composition (coating solution for forming a dye layer 20 of Example 7; hereinafter, "dye layer-forming coating solution-7") in the thermal transfer recording medium 1 prepared in Example 1.

<Dye Layer-Forming Coating Solution-7>
C.I. Solvent Blue 63: 6.0 parts
Polyvinyl acetal resin: 3.5 parts
Nitrocellulose resin: 0.5 parts
Toluene: 45.0 parts
Methyl ethyl ketone: 45.0 parts

Example 8

A thermal transfer recording medium 1 of Example 8 was obtained in the same manner as in Example 1, except that a dye layer 20 was formed by using a coating solution having the following composition (coating solution for forming a dye layer 20 of Example 8; hereinafter, "dye layer-forming coating solution-8") in the thermal transfer recording medium 1 prepared in Example 1.

<Dye Layer-Forming Coating Solution-8>
C.I. Solvent Blue 63: 6.0 parts
Polyvinyl acetal resin: 3.5 parts
Phenoxy resin: 0.5 parts
Toluene: 45.0 parts
Methyl ethyl ketone: 45.0 parts

Comparative Example 1

A thermal transfer recording medium 1 of Comparative Example 1 was obtained in the same manner as in Example 1, except that a dye layer 20 was formed by using a coating solution having the following composition (coating solution for forming a dye layer 20 of Comparative Example 1; hereinafter, "dye layer-forming coating solution-9") in the thermal transfer recording medium 1 prepared in Example 1.

<Dye Layer-Forming Coating Solution-9>
C.I. Solvent Blue 63: 6.0 parts
Polyvinyl acetal resin: 3.5 parts
Polyvinyl butyral resin: 0.5 parts
Toluene: 45.0 parts
Methyl ethyl ketone: 45.0 parts

Comparative Example 2

A thermal transfer recording medium 1 of Comparative Example 2 was obtained in the same manner as in Example 1, except that a dye layer 20 was formed by using a coating solution having the following composition (coating solution for forming a dye layer 20 of Comparative Example 2; hereinafter, "dye layer-forming coating solution-10") in the thermal transfer recording medium 1 prepared in Example 1.

<Dye Layer-Forming Coating Solution-10>
C.I. Solvent Blue 63: 6.0 parts
Polyvinyl acetal resin: 3.5 parts
Polyvinyl alcohol resin: 0.5 parts
Toluene: 45.0 parts
Methyl ethyl ketone: 45.0 parts

Comparative Example 3

A thermal transfer recording medium 1 of Comparative Example 3 was obtained in the same manner as in Example 1, except that a dye layer 20 was formed by using a coating solution having the following composition (coating solution for forming a dye layer 20 of Comparative Example 3; hereinafter, "dye layer-forming coating solution-11") in the thermal transfer recording medium 1 prepared in Example 1.

<Dye Layer-Forming Coating Solution-11>
C.I. Solvent Blue 63: 6.0 parts
Polyvinyl acetal resin: 3.5 parts
Phenoxy resin: 0.5 parts
Toluene: 45.0 parts
Methyl ethyl ketone: 45.0 parts

Comparative Example 4

A thermal transfer recording medium 1 of Comparative Example 4 was obtained in the same manner as in Example 1, except that a dye layer 20 was formed by using a coating solution having the following composition (coating solution for forming a dye layer 20 of Comparative Example 4; hereinafter, "dye layer-forming coating solution-12") in the thermal transfer recording medium 1 prepared in Example 1.

<Dye Layer-Forming Coating Solution-12>
C.I. Solvent Blue 63: 6.0 parts
Polyvinyl acetal resin: 3.5 parts
Cellulose acetate resin: 0.5 parts
Toluene: 45.0 parts
Methyl ethyl ketone: 45.0 parts

Comparative Example 5

A thermal transfer recording medium 1 of Comparative Example 5 was obtained in the same manner as in Example 1, except that a dye layer 20 was formed by using a coating solution having the following composition (coating solution for forming a dye layer 20 of Comparative Example 5; hereinafter, "dye layer-forming coating solution-13") in the thermal transfer recording medium 1 prepared in Example 1.

<Dye Layer-Forming Coating Solution-13>
C.I. Solvent Blue 63: 6.0 parts
Polyvinyl acetal resin: 4.0 parts
Toluene: 45.0 parts
Methyl ethyl ketone: 45.0 parts <Storage Stability Evaluation 1>

The thermal transfer recording media of Examples 1 to 8 and Comparative Examples 1 to 5 were stored at a temperature of 50° C. for 10 days (in the table, represented as "50° C.-10d"). A white solid image (gradation value 0/255, energy not applied to the thermal head) was printed by using a thermal simulator at a voltage of 17 V and at a speed of 8 inches/sec. The hues of a contact portion of the dye layer and a non-contact portion of the dye layer were measured by using a spectral densitometer X-rite 528 (CIE color system, light source: D65, viewing angle: 2 degrees) manufactured by X-rite Inc. to calculate a color difference ΔE. Thus, the storage stability evaluation 1 was performed on the basis of the following criteria. When rated as excellent or good in the evaluation result, the thermal transfer recording medium can be used without problems. When rated as poor, it is problematic in that an intended image cannot be obtained due to dye migration to a portion of the transfer target where the dye should not be transferred.

Excellent: ΔE is less than 0.1
Good: ΔE is less than 0.2
Poor: ΔE is 0.2 or more <Density Evaluation>

The reflection density was measured to evaluate color development of the printed matter obtained by the thermal transfer recording medium. A black solid image (gradation value 255/255) was printed on the thermal transfer recording medium which was not stored at a temperature of 50° C. for 10 days. Then, in the obtained printed matter, the reflection density of cyan of the gradation value 255 was measured by using a spectral densitometer X-rite 528 (filter: status A) manufactured by X-rite Inc. to perform density evaluation. The reflection density of 2.0 or more was acceptable.

Good: Reflection density is 2.0 or more
Poor: Reflection density is less than 2.0

<Evaluation of Image Quality (Presence of Uneven Density)>

The presence of uneven density was evaluated as the image quality of the printed matter obtained by the thermal transfer recording medium. A gradation image with the gradation value 255 to gradation value 0 was printed on the thermal transfer recording medium which was not stored at a temperature of 50° C. for 10 days. Then, the image evaluation was performed by visually determining image quality as described below. When rated as good in the evaluation result, the thermal transfer recording medium can be used without problems in practical use. When rated as poor, it is problematic due to defects in the printed image.

Good: Density unevenness is insignificantly small
Poor: Density unevenness is obvious Table 1 shows the evaluation results of the above Examples 1 to 8 and Comparative Examples 1 to 5. In this table, the columns for material of release agent, solubility parameter of release agent, storage stability evaluation 2, and releasability are left blank. This is for consistency between the evaluation items in Tables 1 and 2, since these items are used in Table 2 for evaluation of Examples 9 to 18 and Comparative Examples 6 to 10.

TABLE 1

|  | Material of binder A | Solubility parameter of binder A [(cal/cm³)^(1/2)] | Melting viscosity of binder A [Pa·sec] | Material of binder B | A/B compounding ratio [Weight ratio] | Material of release agent | Solubility parameter of release agent [(cal/cm³)^(1/2)] |
|---|---|---|---|---|---|---|---|
| Example 1 | Polyvinyl acetate | 9.7 | 250 | Polyvinyl acetal | 22.5/77.5 | None | — |
| Example 2 | Polyvinyl acetate | 9.7 | 250 | Polyvinyl acetal | 12.5/87.5 | None | — |
| Example 3 | Polyvinyl acetate | 9.7 | 250 | Polyvinyl acetal | 7.5/92.5 | None | — |
| Example 4 | Polyvinyl acetate | 9.7 | 250 | Polyvinyl acetal | 27.5/72.5 | None | — |
| Example 5 | Polyvinyl acetate | 9.7 | 250 | Polyvinyl acetal | 2.5/97.5 | None | — |
| Example 6 | Polyvinyl acetate | 9.7 | 250 | Polyvinyl acetal | 32.5/67.5 | None | — |
| Example 7 | Nitrocellulose | 11.4 | 360 | Polyvinyl acetal | 12.5/87.5 | None | — |
| Example 8 | Phenoxy resin | 10.8 | 350 | Polyvinyl acetal | 12.5/87.5 | None | — |
| Comparative Example 1 | Polyvinyl butyral | 9.4 | 280 | Polyvinyl acetal | 12.5/87.5 | None | — |
| Comparative Example 2 | Polyvinyl alcohol | 12.5 | 380 | Polyvinyl acetal | 12.5/87.5 | None | — |
| Comparative Example 3 | Phenoxy resin | 10.8 | 460 | Polyvinyl acetal | 12.5/87.5 | None | — |
| Comparative Example 4 | Cellulose acetate | 11.2 | — | Polyvinyl acetal | 12.5/87.5 | None | — |
| Comparative Example 5 | None | — | — | Polyvinyl acetal | 0/100 | None | — |

|  | Storage stability evaluation 1 (50° C.-10 d) | | Storage stability evaluation 2 (50° C.-10 d) | | Density evaluation | | Evaluation of image quality (presence of uneven density) | Evaluation of releasability |
|---|---|---|---|---|---|---|---|---|
|  | ΔE | Evaluation | ΔE | Evaluation | Reflection density | Judgment | | |
| Example 1 | 0.08 | Excellent | — | — | 2.08 | Good | Good | — |
| Example 2 | 0.09 | Excellent | — | — | 2.07 | Good | Good | — |
| Example 3 | 0.13 | Good | — | — | 2.08 | Good | Good | — |
| Example 4 | 0.06 | Excellent | — | — | 2.09 | Good | Good | — |
| Example 5 | 0.18 | Good | — | — | 2.13 | Good | Good | — |
| Example 6 | 0.07 | Excellent | — | — | 2.02 | Good | Good | — |
| Example 7 | 0.10 | Excellent | — | — | 2.09 | Good | Good | — |
| Example 8 | 0.09 | Excellent | — | — | 2.11 | Good | Good | — |

TABLE 1-continued

| | | | | | | | | |
|---|---|---|---|---|---|---|---|---|
| Comparative Example 1 | 0.22 | Poor | — | — | 2.09 | Good | Good | — |
| Comparative Example 2 | 0.27 | Poor | — | — | 2.12 | Good | Poor | — |
| Comparative Example 3 | 0.10 | Excellent | — | — | 1.94 | Poor | Good | — |
| Comparative Example 4 | 0.09 | Excellent | — | — | 1.93 | Poor | Good | — |
| Comparative Example 5 | 0.27 | Poor | — | — | 2.1 | Good | Good | — |

(Evaluation Results)

From the results of Table 1, it was found that the thermal transfer recording medium 1 of Examples 1 to 8 had no problem for the evaluation items of color development, that is, density evaluation, image quality, and dye stability in 50° C.-10*d* storage state. The results of Examples 1 to 8 and Comparative Example 5 showed that the dye stability was lowered when the binder A was not used. Further, the results of Examples 1 and 7 and Comparative Examples 1 and 2 showed that the dye stability was not satisfactory when the solubility parameter of the binder A contained in the dye layer 20 was out of the range of 9.5 to 12 $(cal/cm^3)^{1/2}$. Further, comparison between Examples 2, 7, and 8 and Comparative Examples 3 and 4 showed that color development was reduced when the melting viscosity at 200° C. was more than 400 Pa sec, or when melting did not occur at 200° C. Further, Comparative Example 2 showed that the image quality was affected by interaction between resins when the solubility parameter of the binder A was more than 12 $(cal/cm^3)^{1/2}$. In addition, in Comparative Example 4, the "melting viscosity" was represented as "-" which indicates that melting does not occur at 200° C. Furthermore, besides the "melting viscosity" in Comparative Example 4, other items are also represented as "-" in Table 1, which indicate that the items are not evaluated.

Moreover, although no problem occurred in practical use, when the compounding ratio between the binder A and the binder B is out of the range of 5/95 to 30/70, as shown in Examples 5 and 6, for example, the dye stability was slightly lowered, or the reflection density approached the lower limit. Accordingly, as shown in Examples 3 and 4, for example, the compounding ratio between the binder A and the binder B is preferably in the range of 5/95 to 30/70.

Examples 9 to 18 and Comparative Examples 6 to 10

<Preparation of Transfer Target>

In the following Examples 9 to 18 and Comparative Examples 6 to 10, a transfer target for thermal transfer was prepared by using a method described below.

A double sided resin-coated paper of 190 μm was used as a substrate. One of the surfaces of the paper was coated with a coating solution for forming a heat-resistant lubricating layer having the following composition by die coating with a dry coating amount of 8.0 g/m². Then, the coated solution was dried to thereby form a heat-insulating layer. Subsequently, an outer surface of the heat-insulating layer was coated with a coating solution for forming an image-receiving layer having the following composition by gravure coating with a dry coating amount of 4.0 g/m². Then, the coated solution was dried to thereby form a transfer target for thermal transfer.

[Coating Solution for Forming Heat-Resistant Lubricating Layer]

The same coating solution for forming a heat-resistant lubricating layer as that used in Examples 1 to 8 and Comparative Examples 1 to 5 was used.

[Coating Solution for Forming Image-Receiving Layer]

Vinyl chloride-vinyl acetate-vinyl alcohol copolymer: 20.0 parts

Toluene: 40.0 parts

Methyl ethyl ketone: 40.0 parts

Example 9

A 4.5 μm-thick polyethylene terephthalate film with an easy adhesion treatment applied on one surface was used as the substrate 10. A surface of the substrate on which the easy adhesion treatment was not applied was coated with a "heat-resistant lubricating layer-forming coating solution-1" (coating solution for forming a heat-resistant lubricating layer 30 of Example 9, which is the same as that used in Examples 1 to 8 and Comparative Examples 1 to 5) by gravure coating with a dry coating amount of 0.5 g/m². Then, the coated solution was dried at a temperature of 100° C. for 1 minute to thereby form a heat-resistant lubricating layer 30.

After the heat-resistant lubricating layer 30 was formed, a surface of the substrate on which the easy adhesion treatment was applied was coated with a coating solution having the following composition (coating solution for forming a dye layer 20; hereinafter, "dye layer-forming coating solution-14") by gravure coating with a dry coating amount of 0.80 g/m². Then, the coated solution was dried at a temperature of 90° C. for 1 minute to thereby form a dye layer 20. Thus, a thermal transfer recording medium 1 of Example 9 was obtained.

<Dye Layer-Forming Coating Solution-14>

C.I. Solvent Blue 63: 6.0 parts

Polyvinyl acetal resin: 2.7 parts

Polyvinyl acetate resin: 1.3 parts

Non-reactive polyether-modified silicone oil: 0.2 parts

Toluene: 44.9 parts

Methyl ethyl ketone: 44.9 parts

Example 10

A thermal transfer recording medium 1 of Example 10 was obtained in the same manner as in Example 9, except that a dye layer 20 was formed by using a coating solution having the following composition (coating solution for forming a dye layer 20 of Example 10; hereinafter, "dye layer-forming coating solution-15") in the thermal transfer recording medium 1 prepared in Example 9.

<Dye Layer-Forming Coating Solution-15>

C.I. Solvent Blue 63: 6.0 parts

Polyvinyl acetal resin: 3.5 parts

Phenoxy resin: 0.5 parts
Non-reactive polyether-modified silicone oil: 0.2 parts
Toluene: 44.9 parts
Methyl ethyl ketone: 44.9 parts Example 11

A thermal transfer recording medium 1 of Example 11 was obtained in the same manner as in Example 9, except that a dye layer 20 was formed by using a coating solution having the following composition (coating solution for forming a dye layer 20 of Example 11; hereinafter, "dye layer-forming coating solution-16") in the thermal transfer recording medium 1 prepared in Example 9.
<Dye Layer-Forming Coating Solution-16>
C.I. Solvent Blue 63: 6.0 parts
Polyvinyl acetal resin: 3.7 parts
Polyvinyl acetate resin: 0.3 parts
Pentaerythritol fatty acid ester: 0.2 parts
Toluene: 44.9 parts
Methyl ethyl ketone: 44.9 parts Example 12

A thermal transfer recording medium 1 of Example 12 was obtained in the same manner as in Example 9, except that a dye layer 20 was formed by using a coating solution having the following composition (coating solution for forming a dye layer 20 of Example 12; hereinafter, "dye layer-forming coating solution-17") in the thermal transfer recording medium 1 prepared in Example 9.
<Dye Layer-Forming Coating Solution-17>
C.I. Solvent Blue 63: 6.0 parts
Polyvinyl acetal resin: 3.5 parts
Phenoxy resin: 0.5 parts
Pentaerythritol fatty acid ester: 0.2 parts
Toluene: 44.9 parts
Methyl ethyl ketone: 44.9 parts Example 13

A thermal transfer recording medium 1 of Example 13 was obtained in the same manner as in Example 9, except that a dye layer 20 was formed by using a coating solution having the following composition (coating solution for forming a dye layer 20 of Example 13; hereinafter, "dye layer-forming coating solution-18") in the thermal transfer recording medium 1 prepared in Example 9.
<Dye Layer-Forming Coating Solution-18>
C.I. Solvent Blue 63: 6.0 parts
Polyvinyl acetal resin: 3.5 parts
Polyvinyl acetate resin: 0.5 parts
Phosphate ester: 0.2 parts
Toluene: 44.9 parts
Methyl ethyl ketone: 44.9 parts Example 14

A thermal transfer recording medium 1 of Example 14 was obtained in the same manner as in Example 9, except that a dye layer 20 was formed by using a coating solution having the following composition (coating solution for forming a dye layer 20 of Example 14; hereinafter, "dye layer-forming coating solution-19") in the thermal transfer recording medium 1 prepared in Example 9.
<Dye Layer-Forming Coating Solution-19>
C.I. Solvent Blue 63: 6.0 parts
Polyvinyl acetal resin: 3.5 parts
Nitrocellulose resin: 0.5 parts
Non-reactive polyether-modified silicone oil: 0.2 parts
Toluene: 44.9 parts
Methyl ethyl ketone: 44.9 parts Example 15

A thermal transfer recording medium 1 of Example 15 was obtained in the same manner as in Example 9, except that a dye layer 20 was formed by using a coating solution having the following composition (coating solution for forming a dye layer 20 of Example 15; hereinafter, "dye layer-forming coating solution-20") in the thermal transfer recording medium 1 prepared in Example 9.
<Dye Layer-Forming Coating Solution-20>
C.I. Solvent Blue 63: 6.0 parts
Polyvinyl acetal resin: 3.7 parts
Polyvinyl acetate: 0.3 parts
Toluene: 45.0 parts
Methyl ethyl ketone: 45.0 parts Example 16

A thermal transfer recording medium 1 of Example 16 was obtained in the same manner as in Example 9, except that a dye layer 20 was formed by using a coating solution having the following composition (coating solution for forming a dye layer 20 of Example 16; hereinafter, "dye layer-forming coating solution-21") in the thermal transfer recording medium 1 prepared in Example 9.
<Dye Layer-Forming Coating Solution-21>
C.I. Solvent Blue 63: 6.0 parts
Polyvinyl acetal resin: 3.7 parts
Polyvinyl acetate: 0.3 parts
Pentaerythritol fatty acid ester: 0.2 parts
Toluene: 44.9 parts
Methyl ethyl ketone: 44.9 parts Example 17

A thermal transfer recording medium 1 of Example 17 was obtained in the same manner as in Example 9, except that a dye layer 20 was formed by using a coating solution having the following composition (coating solution for forming a dye layer 20 of Example 17; hereinafter, "dye layer-forming coating solution-22") in the thermal transfer recording medium 1 prepared in Example 9.
<Dye Layer-Forming Coating Solution-22>
C.I. Solvent Blue 63: 6.0 parts
Polyvinyl acetal resin: 3.7 parts
Polyvinyl acetate: 0.3 parts
Phosphate ester: 0.2 parts
Toluene: 44.9 parts
Methyl ethyl ketone: 44.9 parts Example 18

A thermal transfer recording medium 1 of Example 18 was obtained in the same manner as in Example 9, except that a dye layer 20 was formed by using a coating solution having the following composition (coating solution for forming a dye layer 20 of Example 18; hereinafter, "dye layer-forming coating solution-23") in the thermal transfer recording medium 1 prepared in Example 9.

<Dye Layer-Forming Coating Solution-23>
C.I. Solvent Blue 63: 6.0 parts
Polyvinyl acetal resin: 3.7 parts
Polyvinyl acetate: 0.3 parts
Non-reactive polyether-modified silicone oil: 0.2 parts
Toluene: 44.9 parts
Methyl ethyl ketone: 44.9 parts Comparative Example 6

A thermal transfer recording medium 1 of Comparative Example 6 was obtained in the same manner as in Example 9, except that a dye layer 20 was formed by using a coating solution having the following composition (coating solution for forming a dye layer 20 of Comparative Example 6; hereinafter, "dye layer-forming coating solution-24") in the thermal transfer recording medium 1 prepared in Example 9.
<Dye Layer-Forming Coating Solution-24>
C.I. Solvent Blue 63: 6.0 parts
Polyvinyl acetate resin: 4.0 parts
Non-reactive polyether-modified silicone oil: 0.2 parts
Toluene: 44.9 parts
Methyl ethyl ketone: 44.9 parts Comparative Example 7

A thermal transfer recording medium 1 of Comparative Example 7 was obtained in the same manner as in Example 9, except that a dye layer 20 was formed by using a coating solution having the following composition (coating solution for forming a dye layer 20 of Comparative Example 7; hereinafter, "dye layer-forming coating solution-25") in the thermal transfer recording medium 1 prepared in Example 9.
<Dye Layer-Forming Coating Solution-25>
C.I. Solvent Blue 63: 6.0 parts
Polyvinyl acetal resin: 3.7 parts
Polyvinyl butyral resin: 0.3 parts
Non-reactive polyether-modified silicone oil: 0.2 parts
Toluene: 44.9 parts
Methyl ethyl ketone: 44.9 parts Comparative Example 8

A thermal transfer recording medium 1 of Comparative Example 8 was obtained in the same manner as in Example 9, except that a dye layer 20 was formed by using a coating solution having the following composition (coating solution for forming a dye layer 20 of Comparative Example 8; hereinafter, "dye layer-forming coating solution-26") in the thermal transfer recording medium 1 prepared in Example 9.
<Dye Layer-Forming Coating Solution-26>
C.I. Solvent Blue 63: 6.0 parts
Polyvinyl acetal resin: 3.7 parts
Polyvinyl alcohol resin: 0.3 parts
Non-reactive polyether-modified silicone oil: 0.2 parts
Toluene: 44.9 parts
Methyl ethyl ketone: 44.9 parts Comparative Example 9

A thermal transfer recording medium 1 of Comparative Example 9 was obtained in the same manner as in Example 9, except that a dye layer 20 was formed by using a coating solution having the following composition (coating solution for forming a dye layer 20 of Comparative Example 9; hereinafter, "dye layer-forming coating solution-27") in the thermal transfer recording medium 1 prepared in Example 9.

<Dye Layer-Forming Coating Solution-27>
C.I. Solvent Blue 63: 6.0 parts
Polyvinyl acetal resin: 3.7 parts
Phenoxy resin: 0.3 parts
Non-reactive polyether-modified silicone oil: 0.2 parts
Toluene: 44.9 parts
Methyl ethyl ketone: 44.9 parts Comparative Example 10

A thermal transfer recording medium 1 of Comparative Example 10 was obtained in the same manner as in Example 9, except that a dye layer 20 was formed by using a coating solution having the following composition (coating solution for forming a dye layer 20 of Comparative Example 10; hereinafter, "dye layer-forming coating solution-28") in the thermal transfer recording medium 1 prepared in Example 9.
<Dye Layer-Forming Coating Solution-28>
C.I. Solvent Blue 63: 6.0 parts
Polyvinyl acetal resin: 3.7 parts
Cellulose acetate: 0.3 parts
Non-reactive polyether-modified silicone oil: 0.2 parts
Toluene: 44.9 parts
Methyl ethyl ketone: 44.9 parts
<Storage Stability Evaluation 2>
The thermal transfer recording media of Examples 9 to 18 and Comparative Examples 6 to 10 were stored at a temperature of 50° C. for 10 days (in the table, represented as "50° C.-10d"). A white solid image (gradation value 0/255, energy not applied to the thermal head) was printed at a voltage of 17 V and at a speed of 8 inches/sec by using a thermal simulator. The hues of a contact portion with the dye layer and a non-contact portion with the dye layer were measured by using a spectral densitometer X-rite 528 (CIE color system, light source: D65, viewing angle: 2 degrees) manufactured by X-rite Inc. to thereby calculate a color difference ΔE. Thus, the storage stability evaluation 2 was performed on the basis of the following criteria. When rated as good or fair in the evaluation result, the thermal transfer recording medium can be used without problems. When rated as poor, it is problematic in that an intended image cannot be obtained due to dye migration to a portion of the transfer target where the dye should not be transferred.
Good: ΔE is less than 1.0
Fair: ΔE is 1.0 or more and less than 1.2
Poor: ΔE is 1.2 or more
In the following description, the reasons for the difference between the evaluation criteria for the storage stability evaluation 1 in Examples 1 to 8 and Comparative Examples 1 to 5 and storage stability evaluation 2 in Examples 9 to 18 and Comparative Examples 6 to 10 will be described.
Amino-modified silicone oil is added to the coating solution for forming an image-receiving layer in preparation of a transfer target in Examples 1 to 8 and Comparative Examples 1 to 5, while it is not added in Examples 9 to 18 and Comparative Examples 6 to 10. In Examples 1 to 8 and Comparative Examples 1 to 5, amino-modified silicone oil left in the image-receiving layer in the transfer target serves as a release agent that prevents fusion between the dye layer and the transfer target caused by heat at the time of printing. Accordingly, transfer of ink layer is less likely to occur in the white solid image. As a consequence, ink layer transfer is increased and thus ΔE is larger in Examples 9 to 18 and Comparative Examples 6 to 10 than those in Examples 1 to 8 and Comparative Examples 1 to 5.
Moreover, since a release agent is added to the dye layer 20 in the thermal transfer recording medium 1 used in Examples 9 to 18 and Comparative Examples 6 to 10, the dye together with the release agent migrates to the surface of the dye layer 20. As a consequence, ΔE is larger than the case of Examples 1 to 8 and Comparative Examples 1 to 5, in which a release agent is not added to the dye layer 20.

<Density Evaluation>

The same evaluation was performed as in Examples 1 to 8 and Comparative Examples 1 to 5.

<Evaluation of Image Quality (Presence of Uneven Density)>

The same evaluation was performed as in Examples 1 to 8 and Comparative Examples 1 to 5.

<Releasability Evaluation>

An image having 255 gradations was printed on the transfer target by using a thermal simulator at a voltage of 17 V and at a speed of 8 inches/sec. The thermal transfer recording medium and the transfer target, which were adhered to each other after printing, were peeled off at an angle of 180° and at a speed of 5.0 mm/sec. The image after peeling was visually evaluated for presence of peeling marks on the basis of the following criteria to thereby perform releasability evaluation.

Good: No peeling marks were found in the image after peeling, and the formed image is acceptable.

Poor: Peeling marks were found in the image after peeling, and the formed image is not acceptable, or the recording medium and the transfer target are fused and are not peeled off from each other.

Table 2 shows the evaluation results of the above Examples 9 to 18 and Comparative Examples 6 to 10. In this table, the column for the storage stability evaluation 1 was left blank since it is an evaluation item for Examples 1 to 8 and Comparative Examples 1 to 5.

TABLE 2

| | Material of binder A | Solubility parameter of binder A [(cal/cm³)$^{1/2}$] | Melting viscosity of binder A [Pa·sec] | Material of binder B | A/B compounding ratio [Weight ratio] | Material of release agent | Solubility parameter of release agent [(cal/cm³)$^{1/2}$] | Storage stability evaluation 1 (50° C.-10 d) ΔE | Storage stability evaluation 1 Evaluation | Storage stability evaluation 2 (50° C.-10 d) ΔE | Storage stability evaluation 2 Evaluation | Density evaluation Reflection density | Density evaluation Judgment | Evaluation of image quality (presence of uneven density) | Evaluation of releasability |
|---|---|---|---|---|---|---|---|---|---|---|---|---|---|---|---|
| Example 9 | Polyvinyl acetate | 9.7 | 250 | Polyvinyl acetal | 32.5/67.5 | Non-reactive polyether-modified silicone oil | 7.2 | — | — | 0.43 | Good | 2.07 | Good | Good | Good |
| Example 10 | Phenoxy resin | 10.8 | 350 | Polyvinyl acetal | 12.5/87.5 | Non-reactive polyether-modified silicone oil | 7.2 | — | — | 0.50 | Good | 2.12 | Good | Good | Good |
| Example 11 | Polyvinyl acetate | 9.7 | 250 | Polyvinyl acetal | 7.5/92.5 | Pentaerythritol fatty acid ester | 8.9 | — | — | 0.49 | Good | 2.10 | Good | Good | Good |
| Example 12 | Phenoxy resin | 10.8 | 350 | Polyvinyl acetal | 7.5/92.5 | Pentaerythritol fatty acid ester | 8.9 | — | — | 0.49 | Good | 2.09 | Good | Good | Good |
| Example 13 | Polyvinyl acetate | 9.7 | 250 | Polyvinyl acetal | 12.5/87.5 | Phosphate ester | 8.9 | — | — | 0.81 | Good | 2.04 | Good | Good | Good |
| Example 14 | Nitrocellulose | 11.4 | 360 | Polyvinyl acetal | 12.5/87.5 | Non-reactive polyether-modified silicone oil | 7.2 | — | — | 0.82 | Good | 2.02 | Good | Good | Good |
| Example 15 | Polyvinyl acetate | 11.2 | 250 | Polyvinyl acetal | 7.5/92.5 | None | — | — | — | 0.28 | Good | — | — | — | Poor |
| Example 16 | Polyvinyl acetate | 9.7 | 250 | Polyvinyl acetal | 7.5/92.5 | Pentaerythritol fatty acid ester | 9.3 | — | — | 1.06 | Fair | 2.11 | Good | Good | Good |
| Example 17 | Polyvinyl acetate | 9.7 | 250 | Polyvinyl acetal | 7.5/92.5 | Phosphate ester | 9.5 | — | — | 1.12 | Fair | 2.08 | Good | Good | Good |
| Example 18 | Polyvinyl acetate | 9.7 | 250 | Polyvinyl acetal | 7.5/92.5 | Non-reactive polyether-modified silicone oil | 9.5 | — | — | 1.14 | Fair | 2.04 | Good | Good | Good |
| Comparative Example 6 | Polyvinyl acetate | 9.7 | 250 | None | 100/0 | Non-reactive polyether-modified silicone oil | 7.2 | — | — | 0.31 | Good | 1.89 | Poor | Good | Good |

TABLE 2-continued

| | Material of binder A | Solubility parameter of binder A [(cal/cm³)^(1/2)] | Melting viscosity of binder A [Pa·sec] | Material of binder B | A/B compounding ratio [Weight ratio] | Material of release agent | Solubility parameter of release agent [(cal/cm³)^(1/2)] | Storage stability evaluation 1 (50° C.-10 d) ΔE | Storage stability evaluation 1 Evaluation | Storage stability evaluation 2 (50° C.-10 d) ΔE | Storage stability evaluation 2 Evaluation | Density evaluation Reflection density | Density evaluation Judgment | Evaluation of image quality (presence of uneven density) | Evaluation of releasability |
|---|---|---|---|---|---|---|---|---|---|---|---|---|---|---|---|
| Comparative Example 7 | Polyvinyl butyral | 9.4 | 280 | Polyvinyl acetal | 7.5/92.5 | Non-reactive polyether-modified silicone oil | 7.2 | — | — | 1.21 | Poor | 2.09 | Good | Good | Good |
| Comparative Example 8 | Polyvinyl alcohol | 12.5 | 380 | Polyvinyl acetal | 7.5/92.5 | Non-reactive polyether-modified silicone oil | 7.2 | — | — | 1.42 | Poor | 2.15 | Good | Poor | Good |
| Comparative Example 9 | Phenoxy resin | 10.8 | 460 | Polyvinyl acetal | 7.5/92.5 | Non-reactive polyether-modified silicone oil | 7.2 | — | — | 0.68 | Good | 1.95 | Poor | Good | Good |
| Comparative Example 10 | Cellulose acetate | 11.2 | — | Polyvinyl acetal | 7.5/92.5 | Non-reactive polyether-modified silicone oil | 7.2 | — | — | 0.56 | Good | 1.96 | Poor | Good | Good |

(Evaluation Results)

From the results of Table 2, it was found that the thermal transfer recording medium 1 of Examples 9 to 18 had no problem for the evaluation items of dye stability, color development, that is, density evaluation, image quality, and releasability in 50° C.-10d. The results of Examples 9, 11, 13, and 15 showed that the releasability was not satisfactory when a release agent was not contained in the dye layer 20. Further, the results of Example 9 and Comparative Example 6 showed that, when the binder B was not contained in the dye layer 20, the amount of dye transferred to the transfer target decreased, causing a problem in reflection density. Further, the results of Examples 9, 10, and 14 and Comparative Examples 7 and 8 showed that the dye stability was not satisfactory when the solubility parameter of the binder A contained was out of the range of 9.5 to 12.0 $(cal/cm^3)^{1/2}$. Further, the results of Examples 9, 10, and 14 and Comparative Example 8 showed that the image quality was affected by interaction between resins when the solubility parameter of the binder A was more than 12.0 $(cal/cm^3)^{1/2}$. Further, comparison between Examples 9, 10, and 14 and Comparative Examples 9 and 10 showed that color development was reduced when the melting viscosity at 200° C. was more than 400 Pa sec, or when melting did not occur at 200° C. Further, the results of Examples 9, 11, and 13 and Example 16, 17, and 18 showed that the dye stability was not satisfactory when the solubility parameter of the release agent is more than 9.0 $(cal/cm^3)^{1/2}$. In addition, in Comparative Example 10, the "melting viscosity" was represented as "-", which indicates that melting does not occur at 200° C. Furthermore, in Example 15, the "solubility parameter of release agent" is represented as "-", which indicates that the item is not evaluated.

INDUSTRIAL APPLICABILITY

The thermal transfer recording medium obtained by the present invention is applicable to sublimation transfer printers, and enables easy full-color formation of various images in combination with a high-speed and sophisticated printer, and thus can be widely used for self-prints of digital cameras, cards such as for identification, or output materials for amusement.

REFERENCE SIGNS LIST

1: Thermal transfer recording medium; 10: Substrate; 20: Dye layer; 30: Heat-resistant lubricating layer.

What is claimed is:

1. A thermal transfer recording medium comprising:
   a substrate;
   a heat-resistant lubricating layer provided on a first surface of the substrate; and
   a dye layer provided on a second surface of the substrate, wherein
   the dye layer includes a dye, a first binder, and a second binder which contains at least one of polyvinyl butyral and polyvinyl acetal,
   a solubility parameter of the first binder is within a range of 9.5 $(cal/cm^3)^{1/2}$ or more and 12.0 $(cal/cm^3)^{1/2}$ or less, and
   a melting viscosity of the first binder at 200° C. is 400 Pa sec or less.

2. The thermal transfer recording medium of claim 1, wherein a mass ratio between the first binder and the second binder (mass of the first binder/mass of the second binder) is within a range of 5/95 to 30/70.

3. The thermal transfer recording medium of claim 1, wherein the first binder contains at least one of cellulose resin, phenoxy resin, and polyvinyl acetate.

4. The thermal transfer recording medium of claim 1, wherein
   the dye layer further includes a release agent, and
   a solubility parameter of the release agent is 9.0 $(cal/cm^3)^{1/2}$ or less.

* * * * *